United States Patent
Heiling (10) Patent No.: US 6,749,173 B2
(45) Date of Patent: Jun. 15, 2004

(54) VALVE ARRANGEMENT AND METHOD OF DIRECTING FLUID FLOW

(75) Inventor: Daniel Heiling, Cave Creek, AZ (US)

(73) Assignee: The Hartfiel Company, Eden Prairie, MN (US)

(*) Notice: Subject to any disclaimer, the term of this patent is extended or adjusted under 35 U.S.C. 154(b) by 104 days.

(21) Appl. No.: 10/260,855

(22) Filed: Sep. 27, 2002

(65) Prior Publication Data

US 2004/0061082 A1 Apr. 1, 2004

(51) Int. Cl.⁷ .......................... F16K 7/17; F16K 31/126
(52) U.S. Cl. .................. 251/30.03; 251/30.01
(58) Field of Search ............. 251/30.01–30.05

(56) References Cited

U.S. PATENT DOCUMENTS

| | | | |
|---|---|---|---|
| 552,811 A | 1/1896 | Batchelor | |
| 824,658 A | 6/1906 | Junggren | |
| 2,439,523 A | 4/1948 | Miller et al. | |
| 3,112,094 A | 11/1963 | Nees et al. | |
| 3,780,763 A | 12/1973 | Wisniewski | |
| 3,907,248 A | 9/1975 | Coulbeck | |
| 3,981,478 A | 9/1976 | Lündsgart | |
| 4,310,142 A | * | 1/1982 | Ludwig .................. 251/30.03 |
| 4,311,296 A | 1/1982 | Scheffel | |
| 4,503,887 A | 3/1985 | Johnson et al. | |
| 4,513,943 A | 4/1985 | Russak | |
| 4,552,330 A | 11/1985 | Grotloh | |
| 4,640,093 A | * | 2/1987 | Eastman .................. 60/39.281 |
| 4,986,299 A | 1/1991 | Schultz | |
| 5,417,402 A | 5/1995 | Speybroeck | |
| 5,746,245 A | * | 5/1998 | Foster .................. 137/505.35 |
| 5,899,434 A | * | 5/1999 | Nishimura ............... 251/30.02 |
| 5,967,173 A | * | 10/1999 | Kingsford et al. .......... 137/312 |

FOREIGN PATENT DOCUMENTS

| | | |
|---|---|---|
| CA | 650940 | 10/1962 |
| DE | 0132447 | 9/1978 |
| NL | 7600095 | 7/1977 |
| RU | 465514 | 6/1975 |
| RU | 495485 | 3/1976 |

* cited by examiner

Primary Examiner—Paul J. Hirsch
(74) Attorney, Agent, or Firm—Merchant & Gould P.C.

(57) ABSTRACT

A valve arrangement that controls fluid flow of a working fluid in a fluid system. The valve arrangement including a valve body having first, second, and third pressure chambers functioning under pressure of an operating fluid. The operating fluid is independent of the working fluid. The valve arrangement further including a solenoid valve arranged with the valve body to operably provide fluid communication between the first pressure chamber and the second and third pressure chambers.

20 Claims, 9 Drawing Sheets

VALVE ARRANGEMENT AND METHOD OF DIRECTING FLUID FLOW

TECHNICAL FIELD

This disclosure relates generally to methods and devices for controlling and directing fluid flow. More particularly, this disclosure relates to a valve arrangement that controls fluid flow communication.

BACKGROUND

A wide variety of valve arrangements have been utilized for controlling and directing fluid flow. Some known valve arrangements include an electrical solenoid valve that operates as a pilot valve to control a primary valve passageway. In traditional arrangements, the pilot valve is electronically operated to communicate an operating fluid flow, which in turn controls a primary working fluid flow; the operating fluid flow and the working fluid flow deriving from the same pressure source.

In general, improvement has been sought with respect to such valve arrangements, generally to: provide enhanced fail-safe operations with regards to permitting fluid flow under specific conditions, provide an arrangement having separate operating and working fluid flows, and provide an arrangement where the working fluid is isolated from the operating valve components.

SUMMARY

In one aspect, the present invention relates to a valve arrangement for controlling fluid flow of a working fluid. The valve arrangement includes first, second and third pressure chambers. A solenoid valve provides fluid communication between the first and second pressure chambers. A central shaft having a passage provides fluid communication between the second and third pressure chambers. The valve arrangement utilizes an operating fluid to control operation of the valve arrangement.

Another aspect of the present invention relates to a valve arrangement having a shaft positionable between and first position and a second position. The first and second positions correspond to the closed and open states of the valve arrangement. The shaft is biased to the first position when a solenoid valve is de-energized. The shaft is biased to the second position when the normally-open solenoid valve is energized and an operating fluid is supplied to the valve arrangement.

Yet another aspect of the present invention relates to a method of controlling fluid flow of a working fluid.

DETAILED DESCRIPTION

With reference now to the various figures in which identical elements are numbered identically throughout, a description of various exemplary aspects of the present invention will now be provided.

Figure 11:
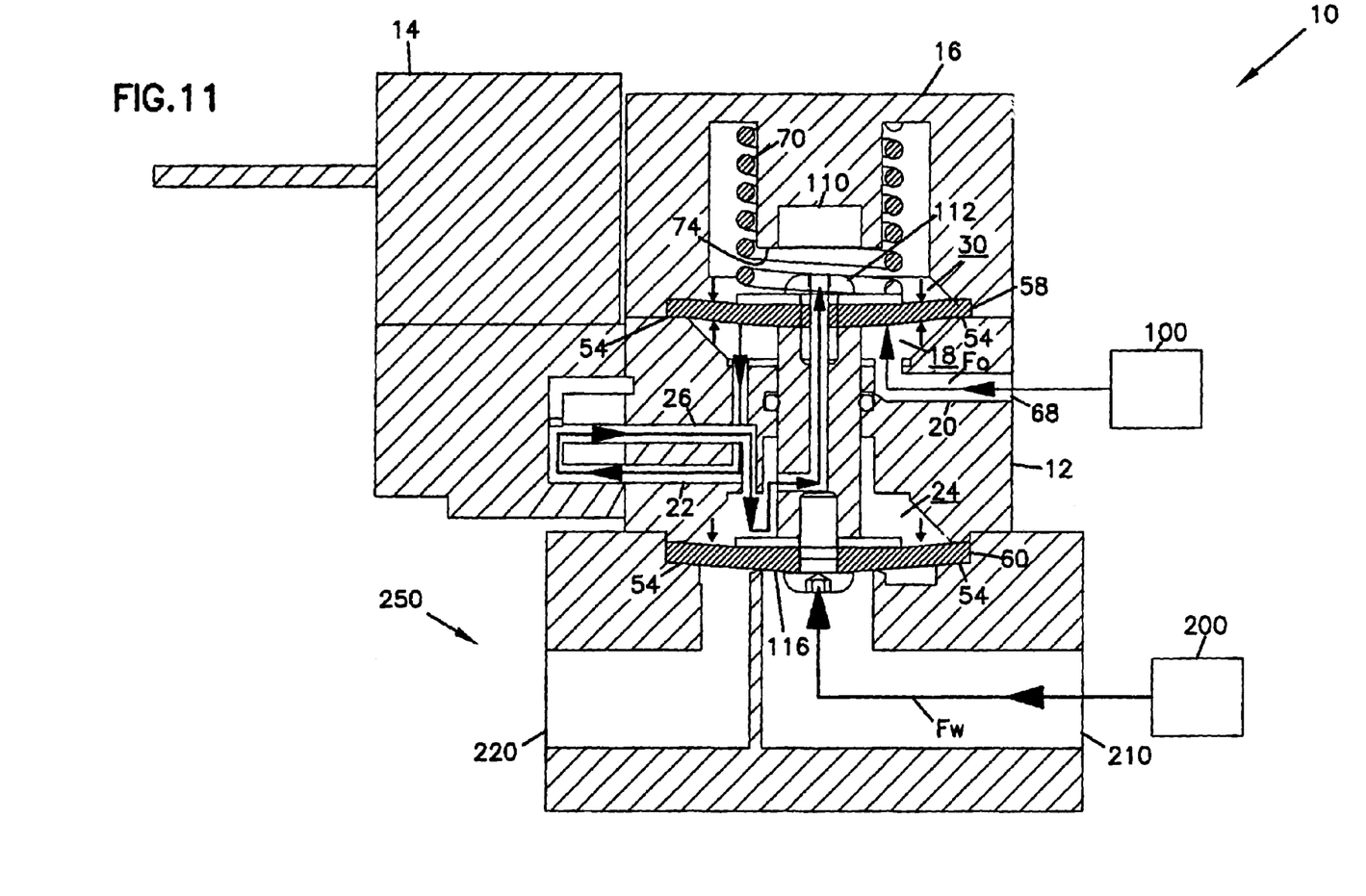
FIG. 11 is a cross-sectional view of the valve arrangement of FIG. 1 shown in a closed state.
Figure 12:
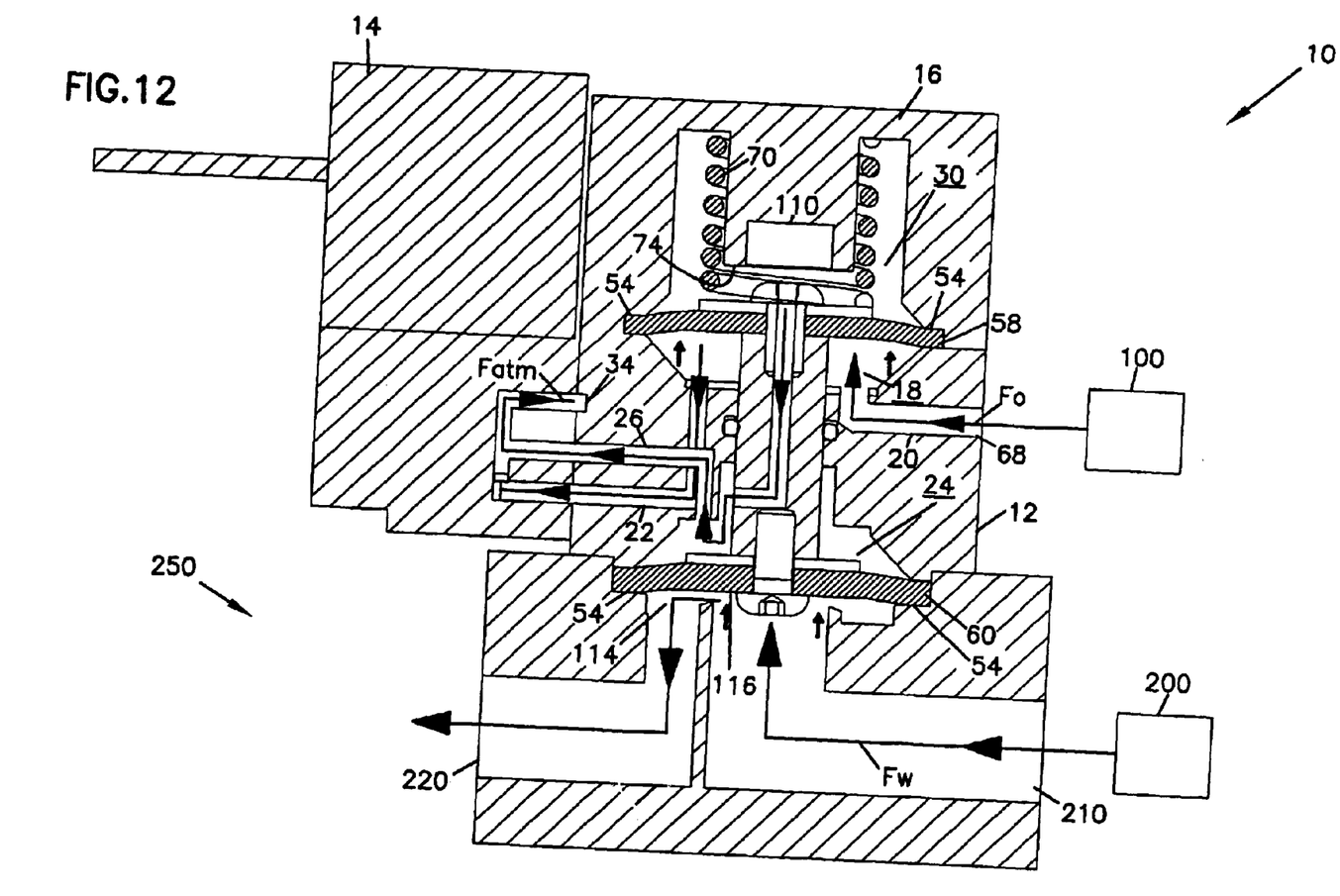
FIG. 12 is a cross-sectional view of the valve arrangement of FIG. 1 shown in an open state.

Referring initially to FIGS. 11 and 12, one embodiment of a valve arrangement 10 in accord with the principles discloses is illustrated. The valve arrangement 10 is configured to control a flow of working fluid $F_W$ from a working fluid pressure source 200. The valve arrangement 10 controls the working fluid by utilizing flow of operating fluid $F_O$ from an operating fluid pressure source 100. The valve arrangement 10 also requires an electrical input to permit flow communication of the working fluid. Working fluid is defined as the primary fluid that the user desires to control between an input 210 and an output 220 of a fluid system 250 (partially represented). Operating fluid is defined as the fluid that controls operation of the valve arrangement 10.

In accord with the principles disclosed, the valve arrangement 10 requires both an electrical input and sufficient pressure from the operating fluid pressure source 100 to control the flow of the working fluid.

Preferably, the operating fluid pressure source 100 and the working fluid pressure source 200 are independent of one another. By this design, as described in greater detail hereinafter, the valve arrangement 10 permits operation only upon receipt of two operation inputs that are independent of one another and independent of the working fluid pressure; the two operating inputs being: the electrical input and the operating pressure source input.

I. Valve Components and Arrangement

Figure 1:
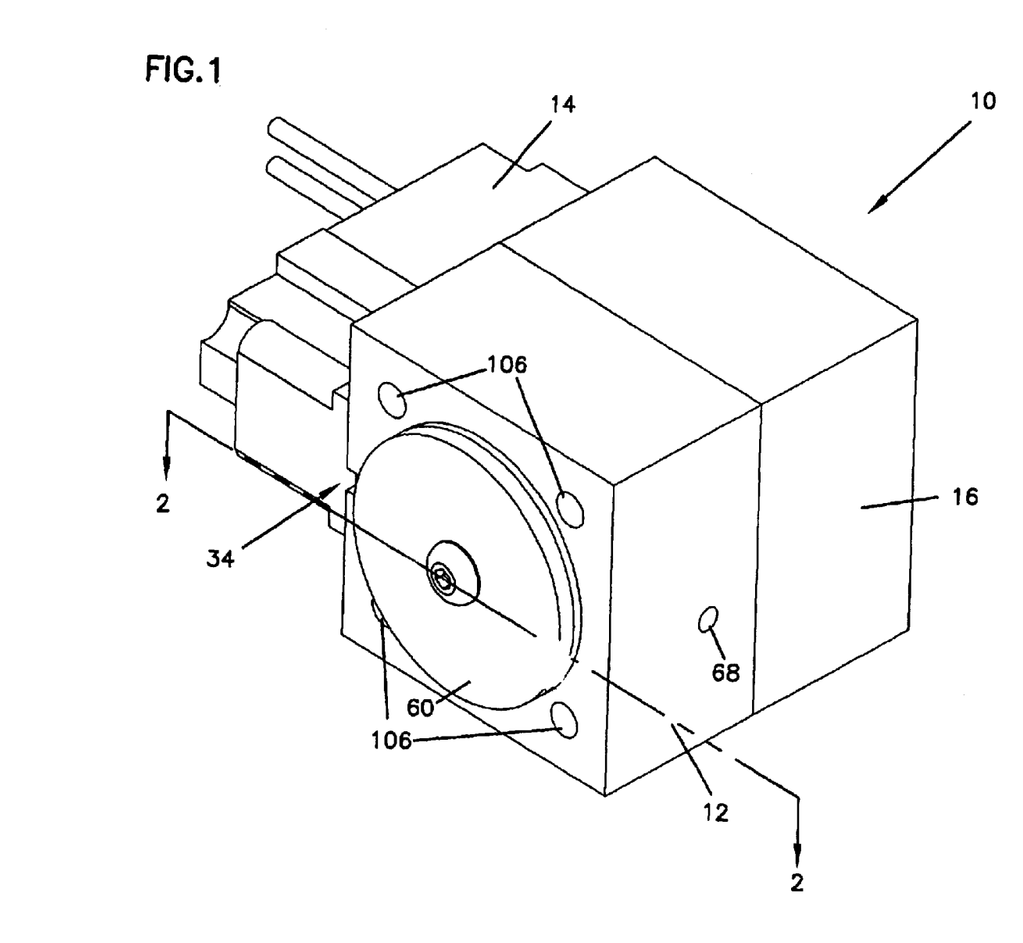
FIG. 1 is a perspective view of one embodiment of a valve arrangement according to the principles of the present disclosure.

Referring now to FIG. 1, the valve arrangement 10 generally includes a main valve housing or valve body 12, a solenoid valve 14 operably connected to the body 12, and an end cap 16. An IN-port 68 is located on the valve body. The IN-port 68 is configured to couple with the operating pressure source 100 (FIGS. 11 and 12). The valve arrangement 10 also includes mounting structure 106 for mounting the valve arrangement 10 to the fluid system 250 (FIGS. 11 and 12).

Figure 3:
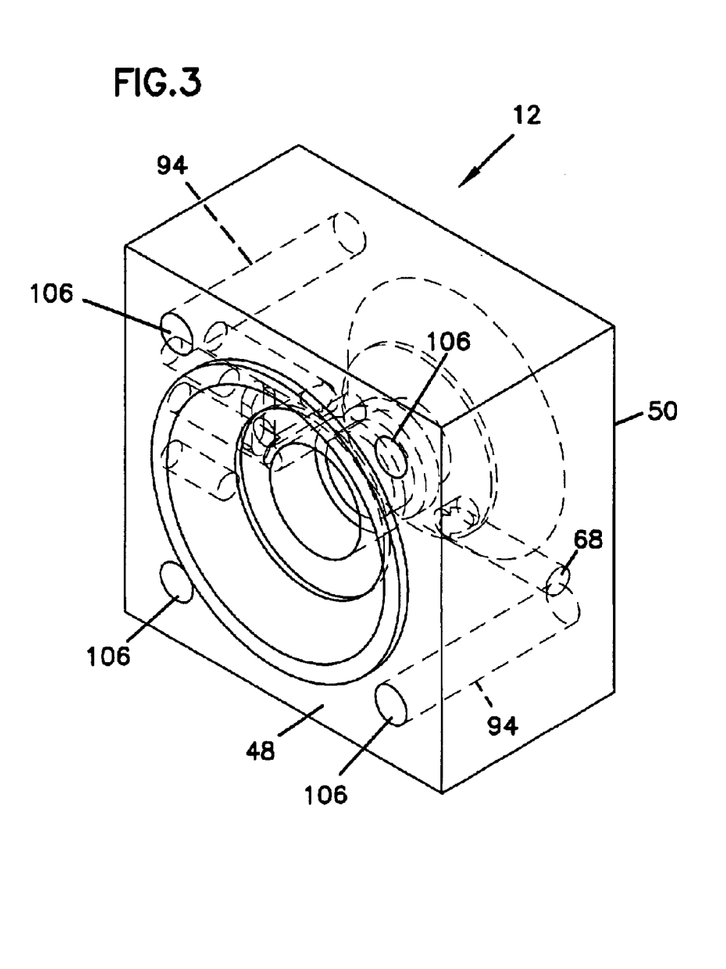
FIG. 3 is a perspective view of a valve body shown in the valve arrangement of FIG. 1.
Figure 4:
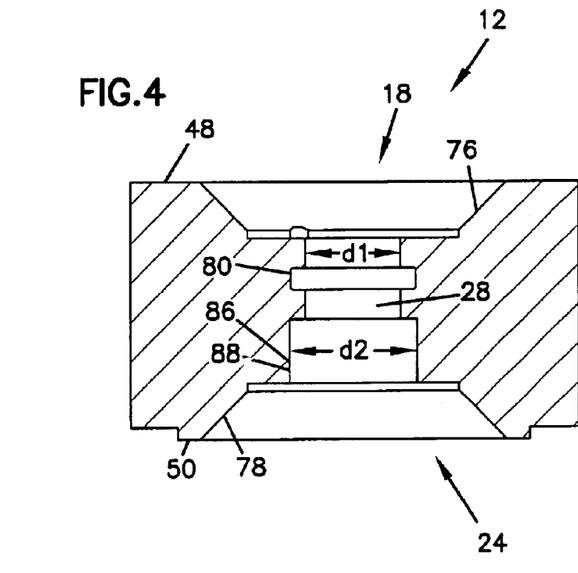
FIG. 4 is a cross-sectional view of the valve body shown in FIGS. 2 and 3.

FIGS. 3 and 4 illustrate one embodiment of the valve body 12 in accord with the present disclosure. The body 12 generally defines a central bore 28 having a diameter d1. The central bore 28 extends through the body 12 from a first end 48 to a second end 50 opposite the first end 48. A first chamfered region 76, generally concentrically aligned with the central bore 28, is located at the first end 48. A second chamfered region 78, generally concentrically aligned with the central bore 28, is located at the second end 50. The first and second chamfered regions partially define a first pressure chamber 18 and a second pressure chamber 24, respectively. It is contemplated that the pressure chambers 18, 20 may be configured other than by chamfered regions, including for example, countersink configurations.

The second pressure chamber 24 includes an extended volume region 86. The extended volume region 86 in the illustrated embodiment is a countersink 88 co-axially aligned with the central bore 28 and located adjacent to the chamfered region 78. Preferably, the extended volume region 86 has a diameter d2 that is sufficiently greater than the diameter d1 of the central bore 28. What is meant by sufficiently greater is that the diameter d2 is large enough so that operating fluid flow within the valve arrangement 10 is not obstructed during valve operation, as will be described in greater detail.

A groove 80 is located between the first pressure chamber 18 and the second pressure chamber 82 along the central bore 28. The groove is sized and configured to receive a seal 82 (FIG. 2), such as an o-ring seal 84. Other types of seals having different configurations for use with different fluid medias, such as D-ring or lip seals, for example, may also be used in accordance with the principles discloses.

Figure 2:
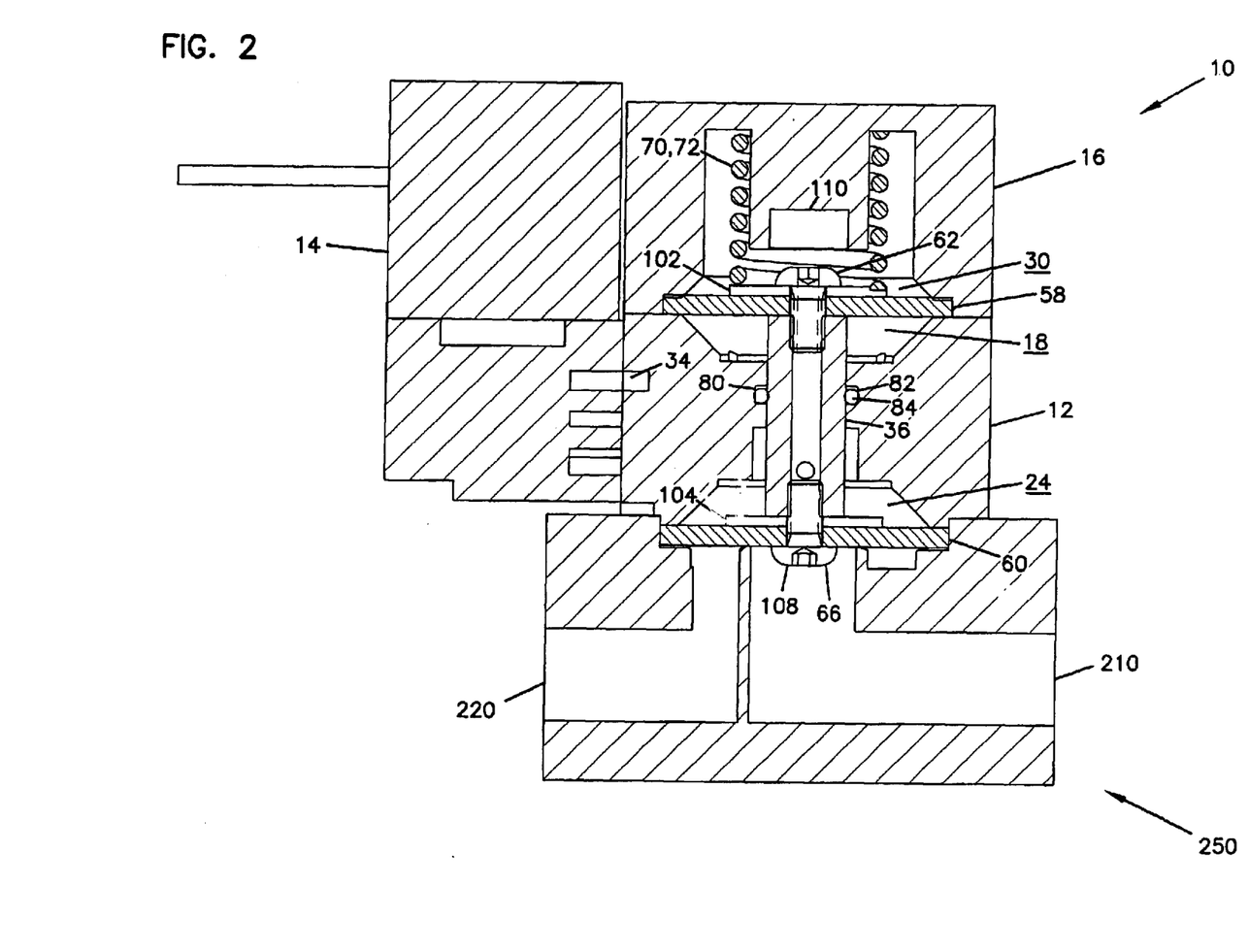
FIG. 2 is a cross-sectional view of the valve arrangement of FIG. 1 taken along line 2—2.
Figure 5:
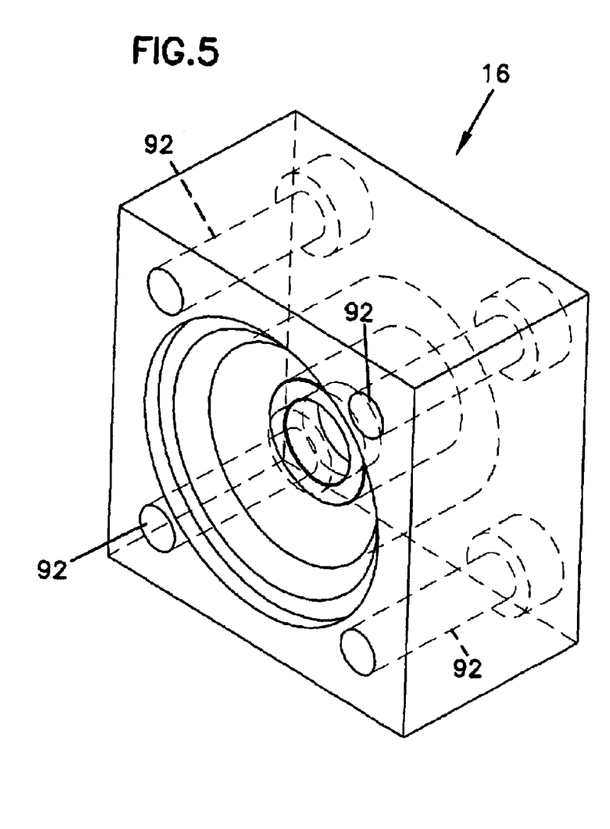
FIG. 5 is a perspective view of an end cap shown in the valve arrangement of FIG. 1.
Figure 6:
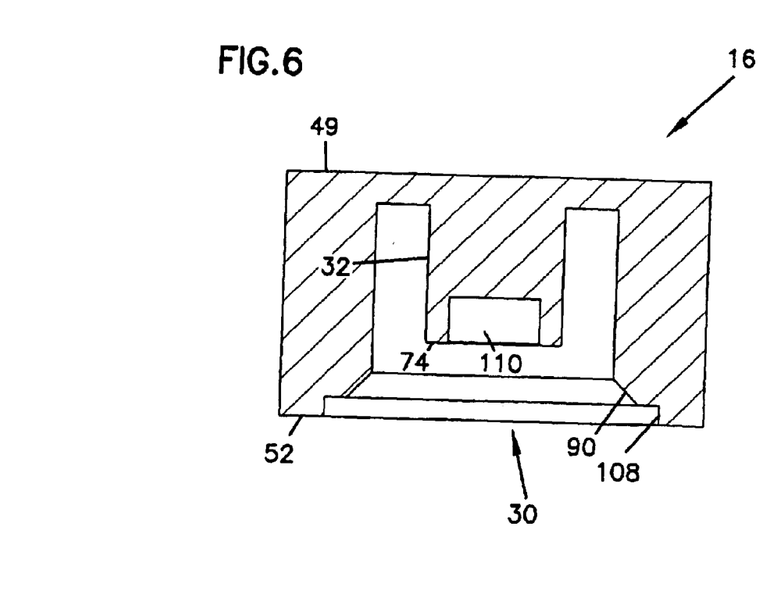
FIG. 6 is a cross-sectional view of the end cap shown in FIGS. 2 and 5.

Referring now to FIGS. 5 and 6, the end cap 16 of the valve arrangement 10 includes a first end 49 and a second end 52. A third chamfered region 90 partially defining a third pressure chamber 30 is located at the second end 52. An annular ring 108 is located adjacent the third pressure chamber 30. The end cap 16 and the valve body 12 are securely fastened together in assembly (FIG. 2). In the illustrated embodiment, the end cap 16 includes throughholes 92 through which fasteners (not shown) are positioned to engage with corresponding holes 94 in the body 12 (FIG. 3). In one embodiment, the holes 94 can be partially threaded, as will be described in greater detail hereinafter.

Still referring to FIGS. 5 and 6, the end cap 16 also includes retaining structure 32. The retaining structure 32 is sized and configured to axially position a spring 70 (FIG. 2). In the illustrated embodiment, the spring 70 is a compression spring 72, and the retaining structure 32 includes a projection 74 sized and configured to fit the inner diameter of the compression spring 72. In an alternative embodiment, the retaining structure may include a construction, such as a recess, formed within the end cap that contacts the outer diameter of the spring to axially position the spring. Further, it is contemplated that other types of springs, such as Belleville springs or wave washers, may be used in accord with the principles disclosed.

Figure 7:
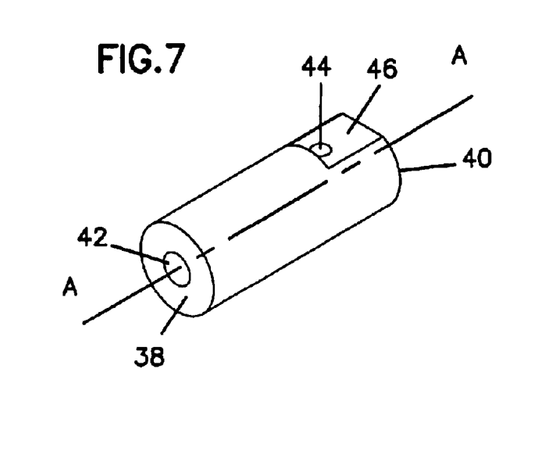
FIG. 7 is a perspective view of a rod shown in the cross-sectional view of FIG. 2.
Figure 8:
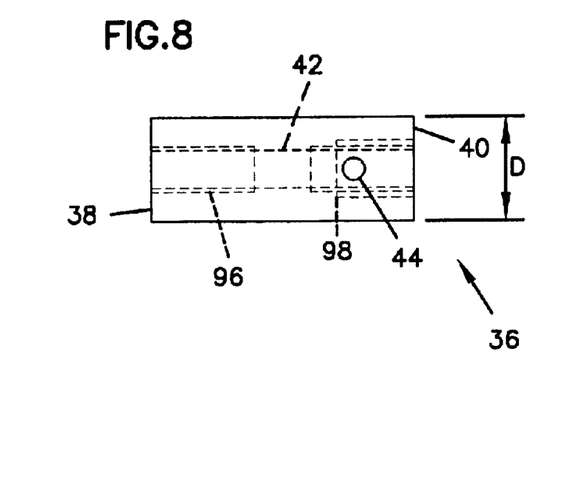
FIG. 8 is a top plan view of the rod shown in FIG. 7.

Referring now to FIG. 2, the valve arrangement 10 includes a reciprocating shaft or rod 36 and first and second diaphragms 58, 60 that couple to the rod 36. As shown in FIGS. 7 and 8, the rod 36 has a diameter D and a longitudinal axis A—A extending from a first end 38 to a second opposite end 40. An axial passageway 42 extends through the rod along the longitudinal axis A—A. In the illustrated embodiment, the passageway 42 has internal threads 96, 98 adjacent each of the end 38, 40. A transverse passage 44 extends radially from the passageway 42. In the illustrated embodiment, the transverse passage 44 is generally perpendicular to the passageway 42 and may or may not extend through the diameter D of the rod 36. A flat surface 46, or wrench flat, may be formed on diameter of the rod 36 for assembly purposes.

Referring again to FIG. 2, the diameter D of the rod 36 is sized and configure to fit within the central bore 28 of the body 12. The size of the seal 82 (FIG. 2) correspond to the diameter D of the rod 36 to seal and isolate the first pressure chamber 18 from the second pressure chamber 24 when the rod 36 is assembled within the central bore 28 of the body 12. In particular, the seal 82 engages the groove 80 and the outer diameter D of the rod 36 to isolate the first and second pressure chambers 18 and 24. It is contemplated that other seal arrangements may be employed to seal and isolate the first and second pressure chambers. For example, the rod 36 may be configured with a rod groove (not shown) and seal arrangement that seals against inner diameter of the central bore 28.

Figure 9:
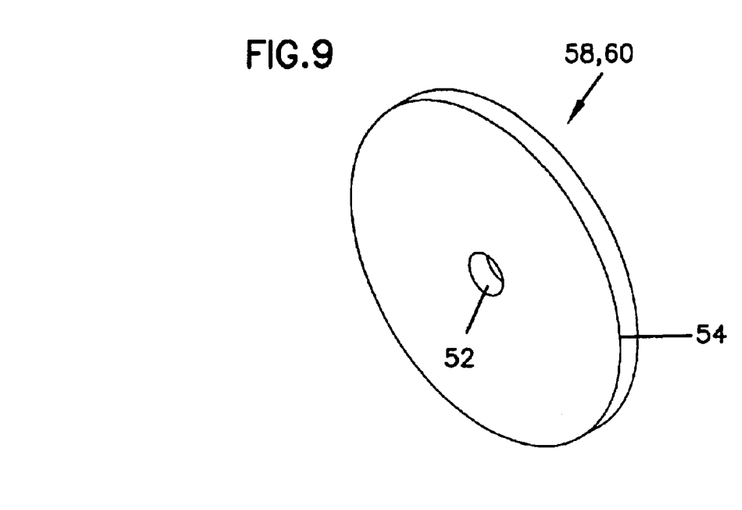
FIG. 9 is a perspective view of a diaphragm shown in the cross-sectional view of FIG. 2.

In the illustrated embodiment, the first and second diaphragms 58, 60 have similar configurations and are generally circular in shape, as shown in FIG. 9. A through hole 52 is centrally located from an edge or circumference 54 of the diaphragm 58, 60.

Figure 10:
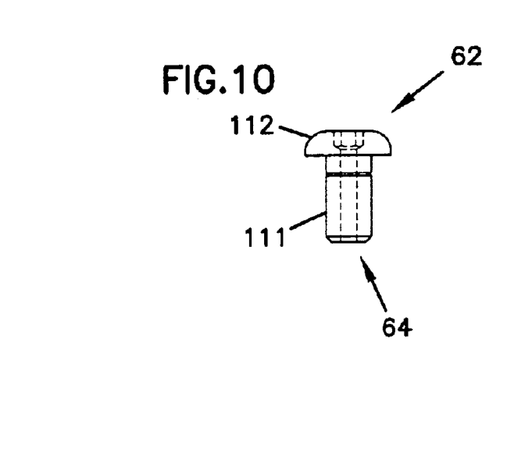
FIG. 10 is a front elevational view of a cored fastener shown in the cross-sectional view of FIG. 2.

The first diaphragm 58 is secured to the first end 38 of the rod 36 by a cored fastener 62 (shown in FIG. 10). In particular, the cored fastener 62 threads into the internal threads 96 (FIG. 8) of the axial passageway 42 at the first end 38 of the rod 36. The cored fastener 62 includes a passage 64 that extend through the shank 111 and head 112 of the fastener 62. As shown in FIGS. 11 and 12, the passage 64 permits fluid communication from the axial passageway 42 of the rod 36 to the third pressure chamber 30 defined within the end cap 16.

The second diaphragm 60 is secured to the second end 40 of the rod 36 by second fastener 66 (shown in FIG. 2). In the illustrated embodiment, the second fastener 66 threads into the internal threads 98 of the axial passageway 42 at the second end 40 of the central rod 36. The second fastener 66 does not provide fluid communication from the axial passageway 42 of the rod 36. Preferably the second fastener 66 seals the axial passageway 42 at the second end 40 of the rod 36.

As can be seen best in FIGS. 11 and 12, the first and second diaphragms 58 and 60 are retained about each diaphragms circumference 54. Specifically, the first diaphragm 58 is pinched or clamped about the circumference 54 between the end cap 16 and the valve body 12. The second diaphragm 60 is pinched or clamped about the circumference 54 between the valve body 12 and a component of the fluid system 250. Preferably, the diaphragms 58, 60 are constructed of a flexible material, such as rubber, for example, to permit flexure of the diaphragms and reciprocating movement of the rod 36, as will be described in greater detail hereinafter. The preferred material also provides a seal along the clamped circumference of the diaphragm.

Referring back to FIG. 2, the first diaphragm 58 partially defines both the first chamber 18 and the third chamber 30 of the valve arrangement 10. The second diaphragm 60 partially defines the second chamber 24 of the valve arrangement 10. In other words, the first chamfered region 76 of the body 12 and the first diaphragm 58 generally define the first pressure chamber 18. The second chamfered region 78 of the body 12 and the third diaphragm 60 generally define the second pressure chamber 24. The third chamfered region 90 of the end cap 16 and the first diaphragm 58 generally define the third pressure chamber 30.

A first backing washer 102 is positioned between the first diaphragm 58 and the cored fastener 62. The first backing washer 102 provides a structural support upon which the spring 70 acts. A second backing washer 104 is positioned between the second end 40 of the rod 36 and the second diaphragm 60. The second backing washer 104 provides structural support to firmly seat the second diaphragm 60 against the fluid flow system 250 when the second chamber 24 is pressurized.

Referring back to FIG. 3, the holes 94 (FIG. 3) of the valve body 12 can be partially threaded at the first end 48 for assembly purposes (i.e. threaded a partial distance, such as ½ inch, along the hole 94 from the first end 48 of the valve body 12). Two assembly fasteners (not shown) can be positioned within the through-holes 92 of the end cap 16 (FIG. 5) and engaged with the partial threads to initially couple the end cap 16 to the valve body 12. The two assembly fasteners assist to maintain spring compression and positioning of the internal components of the valve arrangement 10 during installation. Two longer fasteners (not shown) can then be inserted through the two remaining through-holes 92 of the end cap 16 and inserted through the holes 94 of the valve body 12 to engage with corresponding holes (not shown) of the fluid flow system 250 (FIG. 1). The assembly fasteners can then be removed, and replaced by longer fasteners to complete the installation of the valve assembly 10 to the fluid flow system 250.

II. Operation of the Valve Arrangement

In brief, the present disclosure relates to a valve arrangement having a safety feature that closes the valve arrangement to prevent flow of a working fluid in the event of either an electrical failure or an operating pressure failure. Or in other words, the valve arrangement requires both an electrical input and adequate pressure from an operating fluid to permit flow of a working fluid. The present disclosure also relates to valve arrangement that controls the flow of a working fluid by use of a separate and independent operation fluid. In addition, the present disclosure relates to a valve arrangement that isolates the valve components from a working fluid.

In use, the operating pressure source is preferably a source independent of the working pressure source. The operating pressure source and the working pressure source may also be of different fluid medias. For example, the operating pressure source may be an air pressure source and the working pressure source may be a liquid or hydraulic pressure source.

Referring back to FIG. 2, the valve arrangement 10 of the present disclosure is a normally-closed valve arrangement. What is meant by normally-closed is that fluid communication between the input 210 and the output 220 is closed when the valve arrangement is at rest, i.e. the solenoid is de-energized and operating fluid pressure is not supplied. In the rest state, the rod 36 and diaphragms 58, 60 are in a first position, or a valve-closed position, as shown in FIG. 2. The spring 70 is arranged to bias the rod 36 toward the first position.

There are two other valve arrangement states in which fluid communication between the input 210 and the output 220 is closed: a first closed state and a second closed state. In each of the first and second closed states, either the electrical signal or pressure from the operating fluid is absent or fails. Thus, the first and second closed states are states where one of the two inputs is absent, in contrast to, the rest state where both inputs are absent. FIG. 11 illustrates the valve arrangement 10 in a first closed state. The rod 36 and diaphragms 58, 60 are in the first position when the valve arrangement is in either the first or second closed state.

The open state of the valve arrangement 10 is defined as the state when fluid communication between the input 210 and the output 220 is open. FIG. 12 illustrates the valve arrangement 10 in an open state. The rod 36 and diaphragms 58, 60 are in a second position when the valve arrangement 10 is in an open state.

As shown in FIGS. 11 and 12, the first pressure chamber 18 is in fluid communication with the operating fluid pressure source 100 by a first passageway 20. The first passageway 20 extends from the IN-port 68 of the valve body 12 to the first pressure chamber 18. The IN-port 68 may include a port configuration (not shown) commonly used to couple operating pressure sources to valve arrangements. A second passage 22 configured within the body 12 provides fluid communication between the first pressure chamber 18 and the solenoid valve 14. A third passage 26 provides fluid communication between the solenoid valve 14 and the second pressure chamber 24; thereby the first pressure chamber 18 is in fluid communication with the second pressure chamber 24 via the second the third passages 22, 26 and the solenoid valve 14.

The solenoid valve 14 operates to open and close fluid communication between the first and second pressure chambers 18, 24 of the valve body 12. The solenoid valve in this embodiment is a normally-open solenoid valve so that fluid communication is provided between the first and second pressure chambers when the solenoid valve 14 is de-energized.

In general, the solenoid valves have an open condition and a closed condition. What is meant by de-energized is that the normally-opened solenoid valve 14 is not powered or supplied an electrical input that will switch the solenoid valve from the open condition to a closed condition. Accordingly, what is meant by energized is that the solenoid valve 14 receives power or an electrical input to switch the solenoid from the open condition to a closed condition.

FIG. 11 illustrates the valve arrangement 10 in the first closed state. In the first closed state, adequate operating pressure is supplied, however, the solenoid 14 is de-energized. The operating fluid flows from the first pressure chamber 18, through the normally-open solenoid 14 and into the second pressure chamber 24. As shown by flow arrows, operating fluid within the second pressure chamber 24 is communicated to the third pressure chamber 30 via the transverse passage 44 and the axial passageway 42 of the central rod 36 (FIG. 7), and the passage 64 of the cored fastener 62 (FIG. 10). As described previously, the extended volume region 86 of the second pressure chamber 24 is configured to assist in providing unobstructed fluid flow in the area proximate the transverse passage 44.

Operating pressure from the operating fluid within the first pressure chamber 18 opposes the operating pressure within the third pressure chamber 30 (represented by arrows). The (pressure) forces acting on the first diaphragm 58 are in balanced opposition to one another.

Operating pressure within the second pressure chamber 24 (represented by arrows) is opposed by working pressure from the working fluid. The valve arrangement 10 is configured such that the force resulting from the cross-sectional area of the input 210 in relation to the pressure of the working fluid is less than the summation of forces resulting from the cross-sectional area of the diaphragm in relation to the operating pressure and the spring force. Thus, in the first closed state (i.e. when an electrical signal is absent but adequate operating pressure is supplied), the rod 36 and diaphragms 58, 60 are biased to the first position and close fluid communication between the input 210 and the output 220 of a fluid system.

FIG. 12 illustrates the valve arrangement 10 in an open state when both the solenoid valve 14 is energized and adequate operating pressure is supplied. In this state, the valve arrangement 10 permits fluid communication between the input 210 and the output 220 of a fluid system. Specifically, the solenoid valve 14 vents to atmosphere and fluid communication between the first chamber and the second chamber is closed. As shown by arrows, the operating pressure in the second and third pressure chambers 24 and 30 vent to atmosphere $F_{ATM}$ through the solenoid valve 14 and a vent passage 34 in the valve body 12. Operating pressure thereby exists only within the first pressure chamber 18. The pressurized chamber 18 biases the first diaphragm 58 in a first direction toward the spring 70.

Biasing the first diaphragm 58 in turn shifts or moves the reciprocating rod 36 toward the second position, or valve-open position. As the rod 36 shifts toward the second position, the second diaphragm 60 is also drawn in the first direction. Drawing the second diaphragm 60 in the first direction (toward the second position) expands the volume 114 at an interface 116 between the fluid system 250 and the valve arrangement 10. Thus, the second diaphragm 60 opens fluid communication between the input 210 and the output 220 of the fluid system 250.

In the illustrated embodiment, a recess 110 is located on the projection 74 of the retaining structure 32 to accommodate the reciprocation motion of the rod 36. As shown in FIG. 12, the recess 110 is sized to accommodate the head 112 of the cored fastener 62 when the rod 36 shifts toward the second position.

The valve arrangement 10 provides fail-safe benefits wherein two operation inputs are required to open fluid communication between the input 210 and the output 220 of a fluid system 250. The first closed state of the valve arrangement relates to operation of the valve when adequate operating pressure is supplied, but an electrical signal is absent or fails. The second closed state (not shown) relates to operation of the valve when an electrical signal is present, but operating pressure is absent or inadequate.

FIG. 12 illustrates the solenoid valve 14 in an energized state. If the operating pressure were to fail, the first pressure chamber 18 de-pressurizes. In this state, none of the pressure chambers 18, 24, 30 are pressurized and force from the spring 70 biases the rod 36 to the first position to close fluid communication between the input 210 and the output 220. Thereby, the fail-safe feature of the present valve arrangement permits working fluid flow only upon receipt of an electrical signal and adequate operating pressure.

III. An Alternative Embodiment

Figure 13:
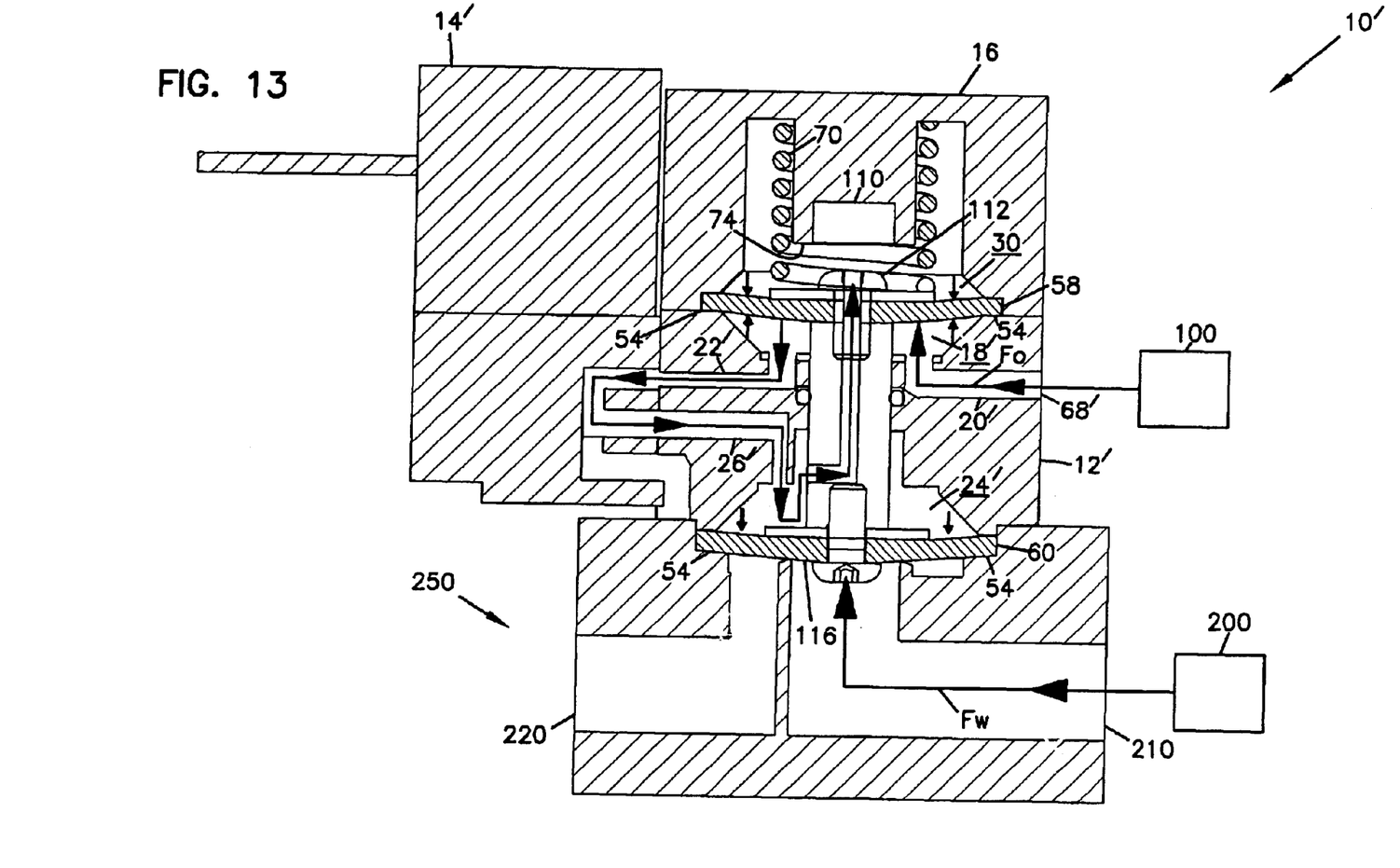
FIG. 13 is a cross-sectional view of another embodiment of the valve arrangement according to the principles of the present disclosure.
Figure 14:
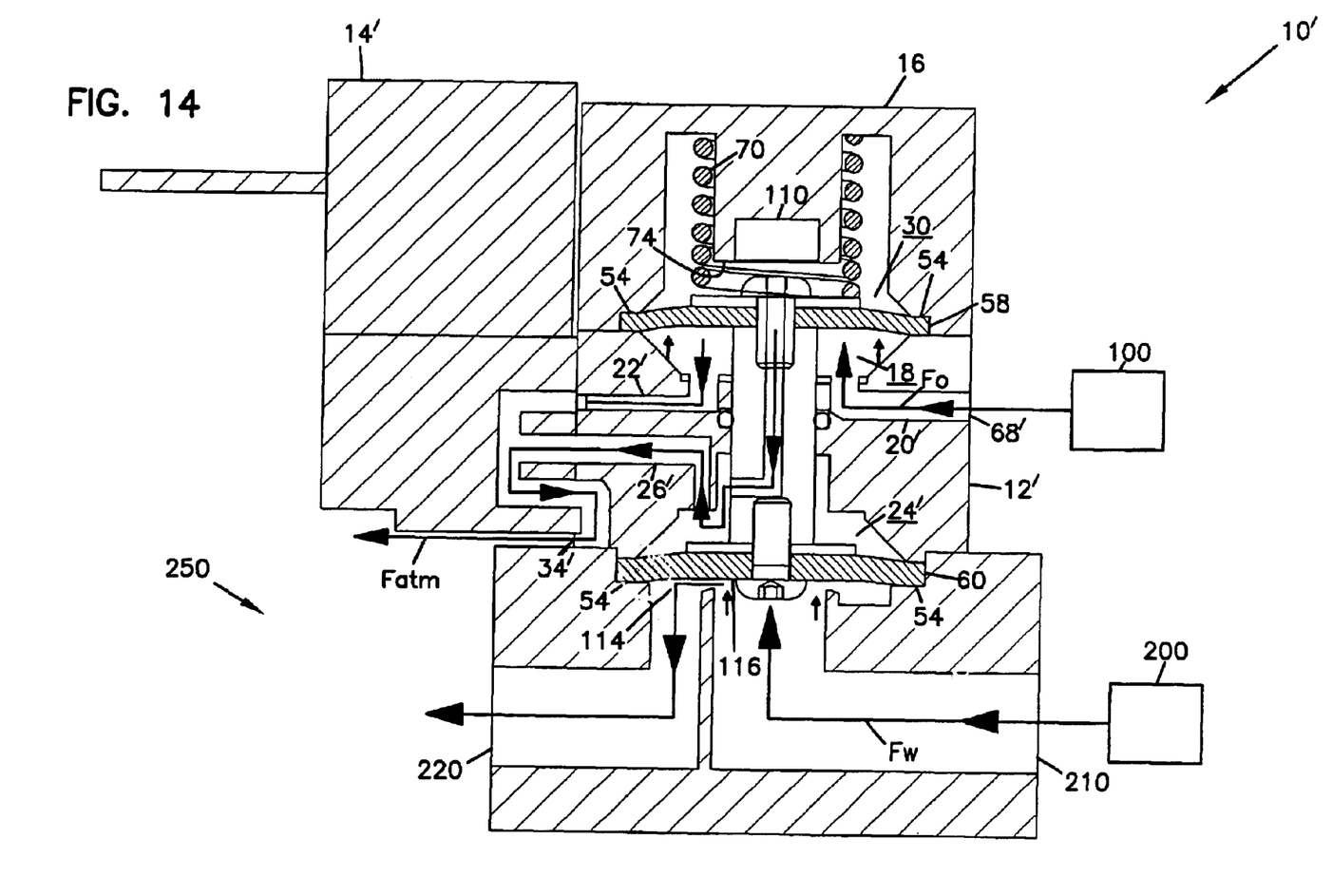
FIG. 14 is a cross-sectional view of the valve arrangement of FIG. 13 shown in an open state.

Referring now to FIGS. 13 and 14, an alternative embodiment of the valve arrangement 10' is illustrated. The valve arrangement 10' includes similar components as those described previously, with the exception of the solenoid valve 14' and the valve body 12'. In this embodiment, the solenoid valve 14' is a normally-closed solenoid valve and the valve body 12' is correspondingly configured.

Similar to the previous embodiment, the alternative valve body 12' includes a first pressure chamber 18' in fluid communication with the operating fluid pressure source 100 by a first passageway 20'. The first passageway 20' extends from an IN-port 68' of the valve body 12' to the first pressure chamber 18'. A second passage 22' configured within the body 12' provides fluid communication between the first pressure chamber 18' and the solenoid valve 14'. A third passage 26' is configured to provide fluid communication between the solenoid valve 14' and a second pressure chamber 24'. The first pressure chamber 18' is in selective fluid communication with the second pressure chamber 24' via the second the third passages 22', 26' and the solenoid valve 14'.

Selective fluid communication is provided by operation of the solenoid valve 14'. The solenoid valve 14' operates to open and close fluid communication between the first and second pressure chambers 18', 24' of the valve body 12'. The solenoid valve 14' in this embodiment is a normally-closed solenoid valve so that fluid communication between the first and second pressure chambers 18', 24' is prevented when the solenoid valve 14' is de-energized.

What is meant by de-energized in this embodiment is that the normally-closed solenoid valve 14' is not powered or supplied an electrical input that will switch the solenoid valve from the closed condition to an open condition. Accordingly, what is meant by energized in this embodiment is that the solenoid valve 14' receives power or an electrical input to switch the solenoid from the closed condition to an open condition.

The valve arrangement 10' is a normally-closed valve arrangement, which normally closes fluid communication between the input 210 and the output 220 of the fluid system 250. In the normally-closed position or rest state, the rod 36 and diaphragms 58, 60 are in the first position, or a valve-closed position, as shown in FIG. 13. The spring 70 is arranged to bias the rod 36 toward the first position.

In this embodiment there is one state (other than the rest state) in which fluid communication between the input 210 and the output 220 is closed: a closed state where operating fluid is absent or fails. FIG. 13 illustrates the valve arrangement 10' in the closed state. The rod 36 and diaphragms 58, 60 are in the first position when the valve arrangement 10' is in the closed state. FIG. 14 illustrates the valve arrangement 10' in an open state, which is defined as the state when fluid communication between the input 210 and the output 220 is open. The rod 36 and diaphragms 58, 60 are in the second position when the valve arrangement 10' is in an open state.

Referring back to FIG. 13, the valve arrangement 10' is in the closed state when adequate operating pressure is supplied and the solenoid 14' is energized. The operating fluid flows from the first pressure chamber 18', through the energized solenoid 14' and into the second pressure chamber 24'. As shown by flow arrows, operating fluid within the second pressure chamber 24' is communicated to the third pressure chamber 30 via the transverse passage 44 and the axial passageway 42 of the central rod 36 (FIG. 7), and the passage 64 of the cored fastener 62 (FIG. 10).

As described with regards to the previous embodiment, the balances of the forces from the chambers' operating pressures and the spring force result in biasing the rod 36 and diaphragms 58, 60 to the first position to close fluid communication between the input 210 and the output 220 of a fluid system.

Referring now to FIG. 14, the valve arrangement 10' is in the open state when the solenoid valve 14' is de-energized and adequate operating pressure is supplied. In this state, the valve arrangement 10' permits fluid communication between the input 210 and the output 220 of a fluid system. Specifically, the solenoid valve 14' vents to atmosphere and fluid communication between the first chamber and the second chamber is closed. As shown by arrows, the operating pressure in the second and third pressure chambers 24' and 30 vent to atmosphere $F_{ATM}$ through the solenoid valve 14' and a vent passage 34' in the valve body 12'. Operating pressure thereby exists only within the first pressure chamber 18'. The pressurized chamber 18' biases the first diaphragm 58 in a first direction toward the spring 70. As described with regards to the previous embodiment, biasing the first diaphragm 58 in turn shifts or moves the reciprocating rod 36 toward the second position, thus opening fluid communication between the input 210 and the output 220 of the fluid system 250.

IV. Generally

Referring now to either embodiment presently described, the rod 36 of the valve arrangement 10 reciprocates between the valve-closed position and the valve-open position. In turn, the first diaphragm 58 and the second diaphragm 60 expand and relax between the valve-closed position and the valve-open position. It is to be understood that other arrangements that react to pressure differential arrangements, such as a piston and seal arrangement for example, can be used in accord with the principles disclosed.

The valve arrangements of the present disclosure can be used in a variety of applications and systems that require fail-safe operation of fluid flow control and/or applications and systems that require the working fluid to be isolated from the operating fluid. The valve arrangements can also be used in applications and systems that require the working fluid to be isolated from the valve components. Specifically, the second diaphragm 60 isolates all the operating components, such as the spring, pressure chambers, rod, etc., from the working fluid. This is particularly beneficial in applications where the working fluid may cause the valve components to rust, or create contamination or bacterial deposit problems if the working fluid were to contact the internal valve components.

The present disclosure can be used in system configured to provide high-pressurized hydraulic power, as well as systems configured to transport low-pressurized fluid. Further, the valve arrangement can be used in a variety of industries, including the medical industry, the manufacturing industry, and the food industry, for example.

The above specification, examples and data provide a complete description of the manufacture and use of the composition of the valve arrangement. Since many embodiments of the valve arrangement can be made without departing from the spirit and scope of this disclosure, the invention resides in the claims hereinafter appended.

What is claimed is:

1. A valve arrangement for controlling fluid flow of a working fluid, the valve arrangement comprising:
   a) a valve body including:
      i) a first chamber configured to be in fluid communication with an operating fluid;
      ii) a second chamber in selective fluid communication with the first chamber;
      iii) a third chamber in fluid communication with the second chamber;
   b) a solenoid valve configured to selectively provide fluid communication between the first chamber and the second chamber;
   c) a central shaft having a passageway, the passageway providing the fluid communication between the second chamber and the third chamber;
   d) a first diaphragm adjacent to a first end of the central shaft, the first diaphragm partially defining the first and third chambers; and
   e) a second diaphragm adjacent to a second end of the central shaft, the second diaphragm partially defining the second chamber.

2. The valve arrangement of claim 1, wherein:
   (a) the valve arrangement is a normally-closed valve arrangement.

3. The valve arrangement of claim 1, wherein:
   (a) the solenoid valve is a normally-open solenoid valve providing fluid communication between the first and second chambers when the solenoid is de-energized.

4. The valve arrangement of claim 3, wherein:
   (a) the valve arrangement is in a closed state when:
      (i) the solenoid valve is de-energized, providing fluid communication between the first and second chambers; and
      (ii) operating pressure is applied, pressurizing the first, second, and third pressure chambers.

5. The valve arrangement of claim 3, wherein:
   (a) the valve arrangement is in a closed state when:
      (i) the solenoid valve is energized, closing fluid communication between the first and second chambers, and venting the second and third chamber to atmosphere; and
      (ii) operating pressure is absent.

6. The valve arrangement of claim 3, wherein:
   (a) the valve arrangement is in an open state when:
      (i) the solenoid valve is energized, closing fluid communication between the first and second chambers, and venting the second and third chamber to atmosphere; and
      (ii) operating pressure is applied, pressurizing the first chamber.

7. The valve arrangement of claim 1, wherein:
   (a) the valve arrangement is in an open state when:
      (i) fluid communication between the first chamber and the second chamber is closed;
      (ii) the second chamber is vented to atmosphere; and
      (ii) the first chamber is pressurized; and
   (b) the valve arrangement is in a closed state when either:
      (i) the first chamber is in fluid communication with the second chamber; or
      (ii) the first chamber is not pressurized.

8. The valve arrangement of claim 1, wherein:
   (a) the valve arrangement is in an open state when only the first chamber is pressured by an operating fluid.

9. The valve arrangement of claim 1, further including:
   (a) a cored fastener having a passage, the cored fastener constructed to secure the first diaphragm to the first end of the central shaft, the passage of the cored fastener providing fluid communication between the second chamber and the third chamber.

10. The valve arrangement of claim 1, further comprising:
    (a) an operating fluid supplied by a first fluid source and a working fluid supplied by a second fluid source, the first fluid source being independent of the second fluid source.

11. The valve arrangement of claim 1, wherein:
    (a) the solenoid valve is a normally-closed solenoid valve providing fluid communication between the first and second chambers when the solenoid is energized.

12. A valve arrangement for controlling flow of a working fluid, the valve arrangement, comprising:
    (a) a valve body, the valve body including:
       (i) a first pressure chamber;
       (ii) a second pressure chamber;
       (iii) a third pressure chamber;
       (iv) each of the each of the first, second, and third pressure chambers being in selective fluid communication with an operating pressure source;
    (b) a reciprocating rod disposed within the valve body, the rod having a first end and a second end;
    (c) a first diaphragm positioned at the first end of the rod;
    (d) a second diaphragm positioned at the second end of the rod; and
    (e) a solenoid valve configured to provide fluid communication:

(i) from the first pressure chamber to the second and third pressure chambers when the solenoid is in an open condition; and (ii) from the second and third pressure chambers to atmosphere when the solenoid is in a closed condition.

13. The valve arrangement of claim 12, wherein:

(a) the solenoid valve is a normally-open solenoid valve.

14. The valve arrangement of claim 13, wherein:

(a) the reciprocating rod is positioned at a valve-closed position when the solenoid valve is de-energized; and (b) the reciprocating rod is positioned at a valve-open position when:
   (i) the solenoid valve is energized; and
   (ii) operating pressure from the operating pressure source is supplied to the first pressure chamber.

15. The valve arrangement of claim 14, wherein:

(a) the rod is positioned at the valve-closed position when:
   (i) the solenoid valve is energized; and
   (ii) operating pressure from the operating pressure source is absent from the first pressure chamber.

16. The valve arrangement of claim 12, wherein:

(a) the solenoid valve is a normally-closed solenoid valve.

17. The valve arrangement of claim 12, wherein:

(a) the operating pressure source is independent of the working fluid.

18. A method of controlling fluid flow through a fluid system, the method comprising:

(a) providing a valve arrangement, the valve arrangement including:
   (i) a valve body, the valve body having:
      (A) a first operating pressure chamber in selective fluid communication with a second operating pressure chamber and a third operating pressure chamber;
   (ii) a solenoid valve;

(b) selectively opening the valve arrangement to permit fluid flow through the fluid system by:
   (i) pressurizing the first operating pressure chamber by selectively positioning the solenoid valve in a closed condition; and
   (ii) venting the second and third operating pressure chambers to atmosphere.

19. The method of claim 18, wherein:

(a) providing a valve arrangement includes providing a normally-closed valve arrangement to prevent fluid flow through the fluid system when:
   (i) an electrical signal to energize the solenoid valve is absent; or
   (ii) operating pressure is absent.

20. The method of claim 18, wherein:

(a) supplying operating pressure includes supplying operating pressure from a first source of fluid; the first source of fluid being independent of the fluid flow of the fluid system.

* * * * *